(12) United States Patent
Tourunen et al.

(10) Patent No.: US 7,301,947 B2
(45) Date of Patent: Nov. 27, 2007

(54) TRANSMISSION OF COMPRESSION IDENTIFIER OF HEADERS ON DATA PACKET CONNECTION

(75) Inventors: Ari Tourunen, Espoo (FI); Juha Kalliokulju, Vesilahti (FI)

(73) Assignee: Nokia Corporation, Espoo (FI)

( * ) Notice: Subject to any disclaimer, the term of this patent is extended or adjusted under 35 U.S.C. 154(b) by 1013 days.

(21) Appl. No.: 10/179,789

(22) Filed: Jun. 24, 2002

(65) Prior Publication Data

US 2003/0007512 A1    Jan. 9, 2003

(30) Foreign Application Priority Data

Jun. 27, 2001  (FI)  .................. 20011380

(51) Int. Cl.
*H04L 12/28* (2006.01)

(52) U.S. Cl. .................. 370/392; 370/465
(58) Field of Classification Search ............ 370/471
See application file for complete search history.

(56) References Cited

U.S. PATENT DOCUMENTS

| 5,987,022 A | 11/1999 | Geiger et al. ............... 370/349 |
| 2002/0001315 A1 | 1/2002 | Tran et al. .................. 370/475 |

FOREIGN PATENT DOCUMENTS

| EP | 1122925 A1 | 8/2001 |
| EP | 1146713 A2 | 10/2001 |
| EP | 1180871 A2 | 2/2002 |
| WO | WO 20000513174 | 8/2000 |
| WO | WO 01/35694 | 5/2001 |
| WO | WO 01/67715 A1 | 9/2001 |
| WO | WO 02/30043 | 4/2002 |

OTHER PUBLICATIONS

Layer 2 and Layer 3 of UTRA-TDD, Gessner, C., Kohn, R., Schniedenharn, J. Sitte, A.; Vehicular Technology Conference Proceedings, 2000. VTC 2000-Spring Tokyo. 2000 IEEE 51st, vol. 2, pp. 1181-1185, May 15-18, 2000.*

(Continued)

*Primary Examiner*—Doris H. To
*Assistant Examiner*—Christopher Grey
(74) *Attorney, Agent, or Firm*—Perman & Green, LLP (57) ABSTRACT

A method of transmitting a context identifier of header compression on a data packet connection in a telecommunications system, in which the context identifier can be transmitted either as part of a compressed data packet or in the header of a data packet to be transmitted at the convergence protocol layer of the telecommunications system. The transmission method of the context identifier is selected by comparing the space available in the header of the convergence protocol layer data packets with the number of context identifiers defined for the compression method, and attaching the context identifiers to the headers of the convergence protocol layer data packets or to a compressed data packet, depending on whether the space available in the header of the convergence protocol layer data packets is larger or smaller than the number of context identifiers defined for the compression method.

22 Claims, 3 Drawing Sheets

OTHER PUBLICATIONS

3GPP TR 25.844 V1.0.0, 3$^{rd}$ Generation Partnership Project; Technical Specification Group Radio Acces Network; Radio Access Bearer Support Enhancements, Dec. 2000.*

Robust Header Compression (ROHC), Bormann, C., <draft-ietf-rohc-rtp-02.txt>, pp. 20 and 23, Sep. 18, 2000.*

3GPP TR 25.844, V4.0.0, 3$^{rd}$ Generation Partnership Project; Technical Specification Group Radio Access Network; Radio Access Bearer Support Enhancements, 2001.

3GPP TS 25.323 V4.0.0, (relevant chapter 5.1.3).

3GPP TS 25.331 V4.0.0, (relevant chapter 10.3.4.2).

* cited by examiner

TRANSMISSION OF COMPRESSION IDENTIFIER OF HEADERS ON DATA PACKET CONNECTION

FIELD OF THE INVENTION

The invention relates to determining header compression for a data packet connection, particularly when compression is applied to mobile communication systems.

BACKGROUND OF THE INVENTION

The rapid development of IP technology (Internet Protocol) during the past few years has expanded the feasible uses of different IP-based applications beyond the conventional Internet data transmission. IP-based telephone applications, in particular, have improved fast, and consequently a larger and larger portion of the call transmission path can in principle be implemented utilizing the IP technology both in traditional switched telephone networks (PSTN/ISDN, Public Switched Telephone Network/Integrated Services Digital Network) and in mobile communication networks (PLMN, Public Land Mobile Network).

In mobile communication networks, in particular, IP technology provides several advantages since in addition to traditional call services, which could be implemented by means of various IP speech applications, the mobile communication networks will offer more and more various data services, such as Internet browsing, e-mail services, games, etc., which are typically most advantageously implemented as packet-switched IP-based services. Thus the IP layers to be included in the protocols of mobile communication systems could serve both audio/video services and various data services.

In mobile communication networks it is particularly important to utilize the limited resources as efficiently as possible. However, this makes it more difficult to utilize IP protocols at the radio interface because, in IP-based protocols, the proportion of various headers in the data to be transferred may be very large, and consequently the proportion of payload is small. Furthermore, in poor conditions the bit error rate (BER) of the radio interface and the round-trip time (RTT) of the uplink and the downlink may increase a lot, which causes problems to most prior art header compression methods. For this reason, a need has arisen to devise a header compression method which is suitable for various IP protocols and for data transmission over the radio interface, in particular: efficient compression of headers which can be utilized in conditions where bit error ratios and delays increase a lot.

For this reason, the IETF (Internet Engineering Task Force) has recently standardized a header compression method known as the ROHC (Robust Header Compression). One of the underlying ideas of the ROHC development is that there is a lot of redundancy between the several IP headers used in data packet transfer, not only inside the data packets but also between them. In other words, most of the information in headers does not change at all during the transmission of data packets, in which case the information included in the headers can be easily reconstructed at the receiving end, even though it is not transmitted at all. Only a small number of headers include information which requires attention in compression. The ROHC further comprises several compression levels where the efficiency of compression increases always when compression shifts to an upper level. The ROHC always tries to use the most efficient compression available; however, before shifting to the next level, it is always ensured that the operation at the level in question is sufficiently reliable.

In the ROHC, several packet data flows transmitted on the same radio link are separated from one another by means of a context identifier CID. The context identifier is attached to a data packet to be transmitted and the receiver can determine the packet data flow and compression context the data packet belongs to from this context identifier. When applied to third generation mobile communication systems, particularly to the UMTS (Universal Mobile Telecommunication System), the context identifier CID can be attached to the data packet to be transmitted at least in two ways. The context identifier can be attached in an internal procedure of the ROHC, where, according to the ROHC specification, a compressed data packet comprises a specific CID field to which the context identifier CID is attached. The other alternative is to attach the context identifier to or associate it with a header of a data packet of a protocol layer of the mobile communication system, preferably to that of the convergence protocol layer, so that the compressed data packet does not include a context identifier CID in accordance with the ROHC specification, but the context identifier or another identifier associated with it is attached to the convergence data packet, particularly to the header of the data packet, into which the above-mentioned ROHC-compressed protocol packet has been fed.

UMTS specification (3GPP TS 25.323, version 4.0.0, paragraph 5.1.3) defines that when the ROHC compression is used, either one of the above-mentioned methods has to be selected, but the specification does not define the selection method. Thus there is a need to devise a method of configuring the UMTS system so that the above-mentioned selection can be carried out.

BRIEF DESCRIPTION OF THE INVENTION

The object of the invention is to provide a method and an apparatus implementing the method to reduce the above-mentioned disadvantages. The objects of the invention are achieved with a method and a system, which are characterized by what is disclosed in the independent claims. The preferred embodiments of the invention are described in the dependent claims.

The invention is based on comparing the space available in the header of data packets, i.e. the number of available PID values, with the number of context identifiers CID available to the ROHC at a given time at a protocol layer of the telecommunications system, such as the convergence protocol layer, and if the number of available PID values exceeds or equals to the number of context identifiers defined for the ROHC, the CID values are preferably attached to the data packets of the convergence protocol layer. This allows to minimize the proportion of headers in the data to be transmitted over the radio interface and reduce the signalling needed to configure transmission of the CID values. If the number of context identifiers CID exceeds the number of available PID values, the context identifiers are always attached to the CID field of the ROHC data packet.

According to a preferred embodiment of the invention, when the method is applied to a mobile communication system, the same comparison algorithm is stored both in the mobile station and in the radio network so that both parties to a packet data connection can use this algorithm for selecting the method to be used for transmitting context identifiers. In that case the mobile station and the radio network do not preferably need any separate signalling between them but both parties can automatically configure the method to be used.

According to another preferred embodiment of the invention, the comparison algorithm can be stored preferably only in the radio network and the comparison described above is performed in the radio network. After the radio network has defined the method to be used for transmitting context identifiers, it informs the mobile station of this decision, preferably by means of RRC signalling.

An advantage of the method and system of the invention is that the method for transmitting the CID values can be determined and both the mobile station MS and the radio network UTRAN can be configured to use this method. Another advantage of the method according to the invention is that it allows optimisation of the proportion of headers in the total amount of data to be transmitted over the radio interface. A further advantage of the invention is that it can be implemented with very small changes, preferably with no changes, to the existing signalling. This is advantageous since it allows efficient utilization of radio resources and reduces the need for changes to the system.

BRIEF DESCRIPTION OF THE DRAWINGS

The invention will be described in greater detail by means of preferred embodiments with reference to the accompanying drawings, in which.

DETAILED DESCRIPTION OF THE INVENTION

In the following, implementation of the header compression method ROHC will be described in essence. As regards a more detailed description of this compression method, reference is made to RFC3095 Robust Header Compression (ROHC).

Different compression methods typically comprise determining a context both for the compressor and for the decompressor, the context representing the state which the compressor uses for compressing a header to be transmitted and which the decompressor uses for decompressing a received header. The context typically includes a non-compressed version of the preceding header transmitted (compressor) or received (decompressor) over the data transmission connection. The context may also comprise data, which identify the data packet flow, such as sequence numbers or time stamps of data packets. Thus the context typically includes both static information, which remains the same for the whole packet flow, and dynamic information, which changes during the packet flow, but often according to a determinable pattern.

The ROHC employs three compression levels: compression starts from the lowest level and shifts gradually to an upper level. The basic principle is that compression is always carried out at as high a level as possible; however, the compressor has to be able to rely on the decompressor having enough information for performing decompression at the level in question. Factors that affect the transition between different compression levels include variation of successive headers, positive and negative acknowledgements received from the decompressor and, if no acknowledgements are used, expiry of certain sequence counters. If necessary, a transition from an upper compression level to a lower level is possible in a corresponding manner.

Figure 1:
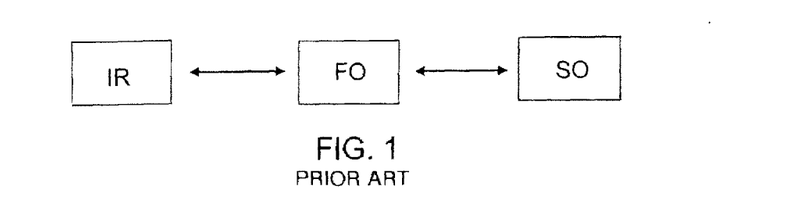
FIG. 1 is a block diagram illustrating transitions between different ROHC compression levels.

The compression levels used in the ROHC in connection with IP (Internet Protocol), UDP (User Datagram Protocol) and RTP (Real-Time Protocol) protocols are an initiation/refresh (IR) order, a first order (FO) and a second order (SO). The transitions between the levels are described in the diagram of FIG. 1. The IR level is used for creating a context for the decompressor or for recovery from an error. The compressor shifts to the IR level when it starts compression of headers, at the request of the decompressor, or as an update timer expires. At the IR level the compressor transmits data packets in a non-compressed form. The compressor tries to shift to an upper level when it receives confirmation that the decompressor has received information on the update.

The FO level is used for informing the receiver of irregularities in headers of the data packet flow. After IR level, the compressor operates at the FO level when the headers do not form a uniform pattern (i.e. successive headers change randomly so that changes cannot be anticipated) or the compressor cannot be certain whether the decompressor has received the parameters that define a uniform pattern for the headers. This situation is typical e.g. when call transmission starts, particularly during the first speech bursts after a break. At the FO level the compressor transmits compressed FO headers. The compressor tries to shift to an upper level again when the headers form a uniform pattern and it receives confirmation that the decompressor has received the parameters of the uniform pattern. The FO-level data packets typically include information on context update, in which case successful decompression also requires successful transmission of successive FO headers. Thus the success of the decompression process is sensitive to lost or damaged FO-level packets.

At the SO level compression is optimal. The headers form a uniform pattern, which the compressor describes by compressed SO headers, which in practice are parts of sequence numbers of data packets. The decompressor is informed of the parameters that define a uniform pattern already at the FO level. On the basis of these parameters and the received sequence number the decompressor can extrapolate the original headers. Since data packets transmitted at the SO level are in practice independent of one another, the error sensitivity of the decompressor is low. After the headers no longer form a uniform pattern, the compressor shifts, back to the FO level.

Three levels dependent on the context definition of the decompressor are also determined for the decompressor. The operation of the decompressor always starts at the lowest level where no context has been defined yet (No Context). In that case the decompressor has not decompressed a single data packet. After the decompressor has decompressed the first data packet, which includes both static and dynamic context information, the compressor can shift directly to the top level (Full Context) over the middle level (Static Context). Due to several errors at the top level, the decompressor shifts to the middle level, but typically even one successfully decompressed data packet makes the decompressor shift back to the top level.

Figure 2:
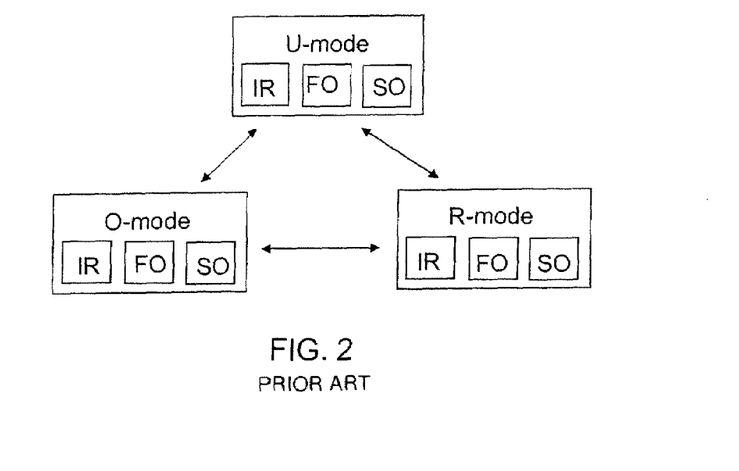
FIG. 2 is a block diagram illustrating transitions between different ROHC operation modes.

In addition to different compression levels, three different operation modes have been defined for the ROHC: unidirectional mode (U mode), bi-directional optimistic mode (O mode) and bi-directional reliable mode (R mode), which are shown in the diagram of FIG. 2. According to FIG. 2, each of the compression levels (IR, FO, SO) described above functions in each mode, but each mode functions differently at each level and also decides on the transitions between the levels in its own way. Which operation mode is selected for a given compression situation depends on the parameters of the data transmission connection used, such as possibility of using a return channel, error probabilities and error distribution, effects of changes in the header sizes, etc.

In the unidirectional mode data packets are transmitted only from the compressor to the decompressor and thus the U mode of the ROHC is practical in situations where a return channel cannot be used or this is inadvisable. The bi-directional optimistic mode corresponds to the unidirectional mode, except that the O mode uses a return channel for correcting errors and for acknowledging significant context updates from the decompressor to the compressor. The O mode is preferably suitable for connections, which require optimal compression efficiency with little return channel traffic. The bi-directional reliable mode differs clearly from the above-mentioned modes. The R mode uses a return channel for acknowledging all context updates and thus also a certain portion of sequence number updates is acknowledged. In the R mode data packets can thus be transmitted almost completely reliably between the compressor and the decompressor.

The three operation modes and three compression levels of the ROHC form different operation situations for header compression. In each situation the operation of the compressor and the decompressor as well as transmission of packets between them need be defined. In the ROHC different packets are used for the purposes of different operation situations. At the moment, six different data packet types are defined for the ROHC; four of these are used for transmission from the compressor to the decompressor, and two as return channel data packets from the decompressor to the compressor. The number of data packet types used may change in the future, but it is characteristic of all data packet types that the context identifier CID identifying the context to be used at a given time can be attached to each data packet before the packet is transmitted to the transmission path.

In the ROHC, the several data packet flows transmitted on the same radio link are separated from one another by a context identifier CID. This context identifier is attached to a data packet to be transmitted and the receiver can determine from this context identifier the packet data flow and compression context the data packet belongs to.

A telecommunications system in which the header compression method according to the ROHC specification is to be applied is a third generation mobile communication which is known at least by the names UMTS (Universal Mobile Telecommunication System) and IMT-2000 (International Mobile Telephone System). In the following, the UMTS system will be described in a simplified manner by means of FIG. 3.

Figure 3:
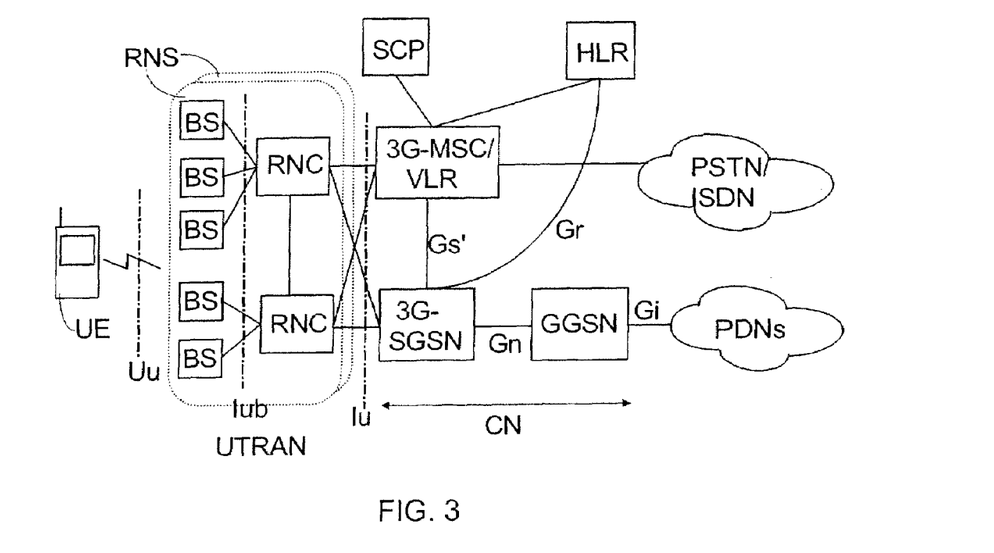
FIG. 3 is a block diagram illustrating a simplified structure of the UMTS system.

FIG. 3 includes only the blocks relevant to describing the invention, but it is clear to a person skilled in the art that a conventional mobile communication system also comprises other functions and structures that need not be explained in greater detail here. The main elements of a mobile communication system are a core network CN and a UMTS terrestrial radio access network UTRAN, which form the fixed network of the mobile communication system, and a mobile station or user equipment UE. The interface between the CN and the UTRAN is called Iu and the interface between the UTRAN and the UE is known as Uu.

The UTRAN typically consists of several radio network subsystems RNS, between which there is an interface called Iur (not shown). The RNS consists of radio network controllers RNC and one or more base stations BS, which are also called node Bs. The interface between the RNC and the BS is called Iub. The base station BS is typically responsible for implementation of the radio path, and the radio network controller RNC at least for the following matters: radio resource management, controlling of handover between cells, power control, timing and synchronization, paging of subscriber terminals.

The core network CN consists of infrastructure belonging to a mobile communication system outside the UTRAN. In the core network, a mobile switching centre/visitor location register 3G-MSC/VLR communicates with a home location register HLR and preferably also with a service control point SCP of the intelligent network. The home location register HLR and the visitor location register VLR contain information on mobile subscribers: the home location register HLR contains information on all subscribers of the mobile communication network and on the services ordered by them, and the visitor location register VLR contains information on mobile stations which visit the area of a certain mobile switching centre MSC. The connection to a serving GPRS support node 3G-SGSN of the radio system is established via a Gs' interface and to a public switched telephone network PSTN/ISDN via a gateway mobile switching centre GMSC (Gateway MSC, not shown). A connection is established from the serving support node 3G-SGSN to the gateway GPRS support node GGSN via a Gn interface, and further from the GGSN to external data networks PDN. Both the mobile switching centre 3G-MSC/VLR and the serving support node 3G-SGSN communicate with the radio network UTRAN (UMTS Terrestrial Radio Access Network) via the Iu interface. It should be noted that the UMTS system is designed so that the core network CN may be identical with the core network of the GSM system, for example, in which case the whole network infrastructure does not need to be rebuilt.

The UMTS system thus also comprises a packet radio system, which is implemented to a great extent in accordance with the GPRS system connected to the GSM network, for which reason the names of the network elements contain references to the GPRS system. The packet radio system of the UMTS may comprise several serving support nodes and gateway support nodes, and typically several serving support nodes 3G-SGSN are connected to one gateway support node 3G-GGSN. Both the 3G-SGSN node and the 3G-GGSN node function as routers which support mobility of the mobile station and control the mobile communication system and route data packets to mobile stations regardless of their location and the protocol used. The serving support node 3G-SGSN communicates with a mobile station UE via the radio network UTRAN. The function of the serving support node 3G-SGSN is to detect mobile stations capable of packet radio connections in its area, transmit data packets to and receive them from these mobile stations and to monitor the location of the mobile stations in its service area. In addition, the serving support node 3G-SGSN communicates with the mobile switching centre 3G-MSC and the visitor location register VLR via the signalling interface Gs' and with the home location register HLR via the Gr interface. The home location register HLR also contains records, which are related to the packet radio service and include the contents of subscriber-specific packet data protocols.

The gateway support node 3G-GGSN functions as a gateway between the packet radio system of the UMTS network and an external data network PDN (Packet Data Network). External data networks include a UMTS or a GPRS network of another network operator, the Internet, an X.25 network or a private local area network. The gateway support node 3G-GGSN communicates with these data networks via a Gi interface. The data packets to be transmitted between the gateway support node 3G-GGSN and the serving support node 3G-SGSN are always encapsulated according to a gateway tunnelling protocol GTP. The gateway support node 3G-GGSN also contains the PDP addresses (Packet Data Protocol) of mobile stations and the routing data, i.e. 3G-SGSN addresses. Thus the routing data are used for linking data packets between the external data network and the serving support node 3G-SGSN. The network between the gateway support node 3G-GGSN and the serving support node 3G-SGSN is a network which utilizes the IP protocol, preferably IPv6 (Internet Protocol, version 6).

Figure 4A:
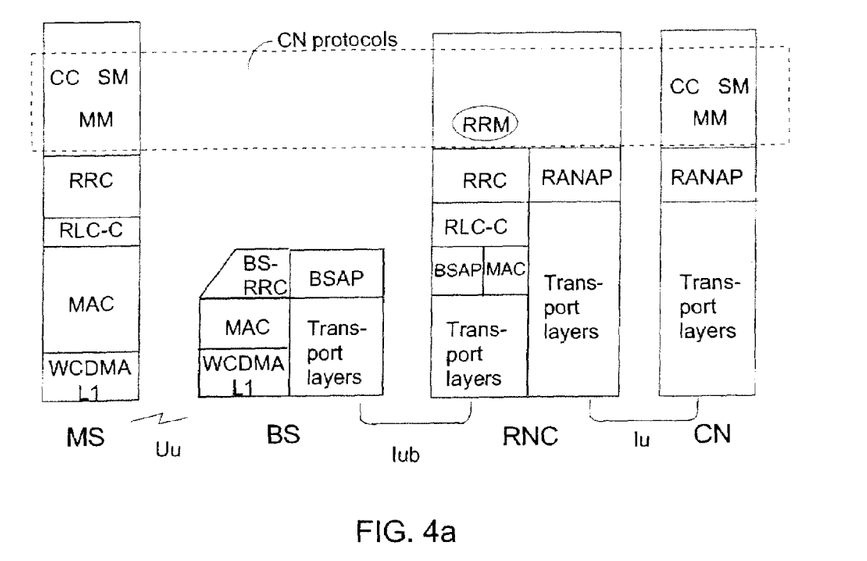
FIGS. 4a and 4b illustrate protocol stacks of the UMTS packet data service for control signalling and transmission of user data.
Figure 4B:
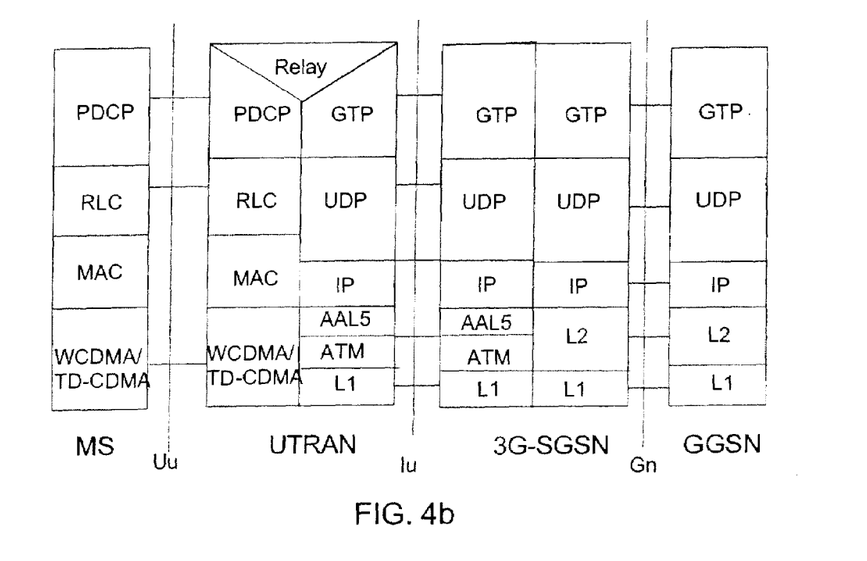

FIGS. 4a and 4b illustrate UMTS protocol stacks for control signalling (control plane) and transmission of user data (user plane) in the packet radio service of the UMTS system. FIG. 4a illustrates the protocol stack used for control signalling between the mobile station MS and the core network CN. Mobility management MM of the mobile station MS, call control CC and session management SM are signalled at the uppermost protocol layers between the mobile station MS and the core network CN so that the base stations BS and the radio network controller RNC between them are transparent to the signalling. Radio resource management on the radio connection between the mobile stations MS and the base stations BS is controlled by a radio resource management RRM system, which transmits control data from the radio network controller RNC to the base stations BS. These functionalities related to the general management of the mobile communication system form a set of protocols called core network protocols (CN protocols), also known as Non-Access Stratum. Correspondingly, signalling related to radio resource management between the mobile station MS, the base station BS and the radio network controller RNC is performed at protocol layers called together radio network protocols (RAN protocols), i.e. Access Stratum. At the lowest level these include transmission protocols which transmit control signalling which is transferred to the upper layers for further processing. The most important upper access stratum layer is the radio resource control RCC protocol, which is responsible for establishment, configuration, maintenance and disconnection of radio connections between the mobile station MS and the radio network UTRAN and for transmission of control information from the core network CN and the radio network RAN to mobile stations MS. In addition, the radio resource control RRC protocol is responsible for reserving enough capacity for a terminal connection according to the instructions of the radio resource management RRM system in application-based capacity reservation, for example.

In the UMTS, a protocol stack according to FIG. 4b is used in the transmission of packet-switched user data. At the interface Uu between the radio network UTRAN and the mobile station MS, lower-level data transmission is carried out according to the WCDMA or TD-CDMA protocol at the physical layer. Data packets are transmitted between the physical layer and the RLC layer (Radio Link Control) by a MAC layer (Media Access Layer) which is above the physical layer, and the RLC layer is responsible for logical management of radio links of different terminal connections. The functionalities of the RLC include segmentation of the user data to be transmitted (RLC-SDU, Service Data Unit) into one or more RLC data packets RLC-PDU. The IP headers included in the data packets (PDCP-PDU) of the PDCP layer on top of the RLC can be compressed, if desired. After this, the PDCP-PDUS, which correspond to one RLC-SDU, are supplied to the RLC. The user data and the RLC-SDUs are segmented and transmitted in RLC frames to which address and control information necessary for data transmission has been added. The RLC layer is also responsible for retransmission of damaged frames. The serving support node 3G-SGSN is responsible for routing the data packets arriving from the mobile station MS via the radio network RAN further to the correct gateway support node 3G-GGSN. This connection uses the tunnelling protocol GTP, which encapsulates and tunnels all the user data and signalling transmitted via the core network. The GTP protocol is run above the IP used by the core network.

In the UMTS system, header compression is performed on data packets to be transmitted and decompression on data packets to be received at the convergence protocol layer PDCP. The tasks of the PDCP layer include functions which are related to improvement of channel efficiency and are typically based on different optimisation methods, such as utilization of compression algorithms of data packet headers. Since the network-level protocols designed for the UMTS are nowadays IP protocols, also the compression algorithms used are algorithms standardized by the IETF (Internet Engineering Task Force). Thus the ROHC compression method is particularly suitable for the UMTS system. The PDCP layer of the terminal typically supports several header compression methods to enable connection establishment to as many protocol types of the network layer as possible.

When the ROHC is applied to the UMTS convergence protocol layer, both the transmitting PDCP and the receiving PDCP comprise a pair of compressor/decompressor for compressing the data packets to be transmitted and decompressing the received data packets. The convergence protocol layer PDCP provides a mechanism for the compression method ROHC for negotiating different parameters which determine compression for each terminal connection. In practice, the mechanism can be implemented e.g. so that the PDCP layer forwards messages of the compressor and decompressor to the RRC and the actual negotiation occurs as RRC signalling.

According to the UMTS specification, the context identifier CID can be attached to a data packet to be transmitted in at least two ways. The context identifier can be attached in an internal procedure of the ROHC, where, according to the ROHC specification, a compressed data packet includes a specific CID field to which the context identifier CID is attached. The other alternative is to attach the context identifier to or associate it with a data packet PDCP-PDU of the UMTS PDCP layer so that a compressed data packet does not include a context identifier CID in accordance with the ROHC specification, but the context identifier or another identifier associated with it is attached to the PDCP layer data packet PDCP-PDU into which the ROHC compressed data packet has been mapped.

At the PDCP layer different compression methods are indicated and separated from one another by means of packet identifiers PID attached to the data packets PDU. A table is created for packet identifier PID values for each PDCP entity. In the table, different compression algorithms are matched with different packet types, and the combination of these defines the value of the packet identifier PID. Typically only one PID value is reserved for the ROHC. The PID is a five-bit field in the PDCP-PDU structure, which can receive values from 0 to 31. If no compression algorithm is used, the packet identifier PID is given the value zero. PID values are determined successively for each compression algorithm and its combinations with different data packet types so that the PID values of each compression algorithm start from n+1, where n is the last PID value determined for the preceding compression algorithm. The order of compression algorithms is determined in negotiations with the radio resource controller RRC. On the basis of the table of PID values, the PDCP entities at both ends of the packet data connection can identify the compression algorithms and data packet types of the data packets to be transmitted and received.

After this, a mechanism for performing the above-mentioned selection for transmitting the CID values on the PDCP connection can be created by comparing the number of PID values available with the number of context identifiers available to the ROHC at a given time. If the number of available PID values exceeds or equals to the number of context identifiers defined for the ROHC, the CID values are preferably attached to the PDCP-PDU data packets. This allows to minimize the proportion of headers in the total amount of data to be transmitted over the radio interface and reduce the signalling needed to configure transmission of the CID values. If the number of context identifiers CID exceeds the number of available PID values, the context identifiers are always attached to the CID field of a ROHC data packet.

This method can be applied by storing the same comparison algorithm both in the mobile station MS and in the radio network UTRAN, which allows both parties to the PDCP connection to use this algorithm for selecting the method to be used for transmitting context identifiers. In that case the mobile station MS and the radio network UTRAN do not preferably need any separate signalling between them to agree on the method, but both parties can automatically configure the method to be used.

In some situation, on the other hand, it may be advantageous if the radio network UTRAN always determines the method to be used for transmitting context identifiers. This may be the case e.g. when the update of the comparison algorithm should be easy to carry out, or if one generally wants the radio network to control the operation of mobile stations to as large an extent as possible. In that case the comparison algorithm can be preferably stored only in the radio network and the comparison described above can be performed in the radio network. After the radio network UTRAN has defined the method to be used for transmitting context identifiers, it informs the mobile station MS of this decision. This can be preferably carried out as RRC signalling, to which the above-mentioned definition can be added with very small changes. The definition can be preferably attached e.g. to the PDCP info definition discussed in specification 3GPP TS 25.331, version 4.0.0., paragraph 10.3.4.2, preferably by adding a field, e.g. CID value field, which defines which of the above-mentioned context identifier transmission methods is to be used. This message is transmitted as RRC signalling known per se to the mobile station MS, which decodes the message and configures to use the context identifier transmission method defined for it.

Figure 5:
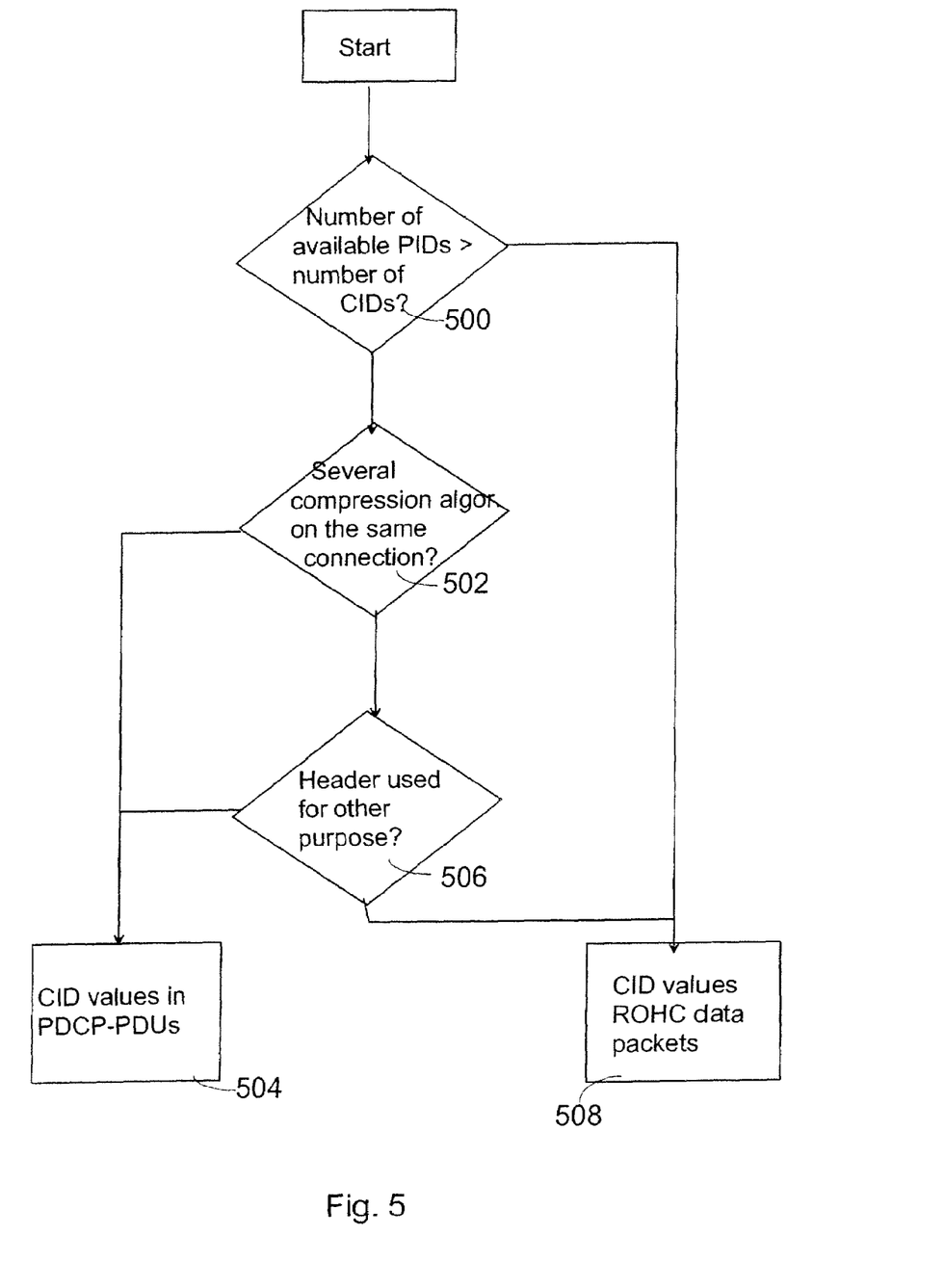
FIG. 5 is a flow diagram illustrating a comparison algorithm according to an embodiment of the invention for determining transmission of context identifiers.

The following describes a comparison algorithm implemented according to a preferred embodiment of the invention with reference to FIG. 5. First, the number of available PID values is compared with the number of context identifiers CID allocated to the ROHC (500). The number of available PID values is obtained by subtracting the number of compression algorithms reserved for other compression algorithms than the ROHC from the maximum number 31 of the PID values. If the number of available PID values exceeds or equals to the number of context identifiers CID allocated to the ROHC, it is checked whether other connection definitions require attachment of a header to the PDCP-PDU data packets. If a header is needed in the PDCP-PDU data packets in any case, the CID values are preferably attached to the PDCP-PDU data packets. This can be carried out in two steps by first determining whether several compression algorithms (502) have been defined for the radio bearer. If several compression algorithms have been defined for the same radio bearer, the PDCP-PDU data packets comprise a header and thus the method where the CID values are attached to the PDCP-PDU data packets (504) is defined to be used. If several compression algorithms have not been defined for the same radio bearer, it is checked whether the PDCP-PDU header is needed for some other purpose, e.g. for transmitting (506) sequence numbers. If this is the case, the method where the CID values are attached to the PDCP-PDU data packets (504) is defined to be used in this case, too. If no header is needed in the PDCP-PDU data packets, it is not advantageous to define a header for the PDCP-PDU data packets only for transmission of the CID values, and thus it is defined that the CID values are defined to be transmitted in the CID fields (508) of the ROHC data packets.

If it is noticed in the comparison (500) carried out at the beginning that the number of available PID values is smaller than the number of context identifiers CID allocated to the ROHC, it is defined that the CID values are defined to be transmitted directly in the CID fields of the ROHC data packets (508).

Since the CID values are not necessarily commensurate with the PID values, the attachment of CID values to the PDCP-PDU data packets described above can preferably be carried out by associating a corresponding PID value with each CID value before transmission. The PID value is transmitted normally in the PID field of the PDCP-PDU.

It should be noted that the comparison algorithm described above is only one way of defining transmission of CID values. It is obvious to a person skilled in the art that the algorithm can be defined in several ways but the result will be the same in respect of the inventive concept. Furthermore, the invention is not limited to determination of the CID values only on the PDCP connection, but the invention can also be applied at different protocol layers in other systems.

The method according to the invention can thus be employed for defining a method of transmitting CID values and configuring both the mobile station MS and the radio network UTRAN to use this method. The method according to the invention also enables optimisation of the proportion of headers in the total amount of data to be transmitted over the radio interface. The method of the invention can be implemented with very few changes, preferably with no changes, to the existing signalling. This is advantageous since it allows efficient utilization of radio resources and reduces the need for changes to the system.

The method of the invention was described above by using the UMTS system as an example. Compression of headers according to the ROHC is not, however, limited to the UMTS system, but it can be preferably applied to any telecommunications system where IP data packets are transmitted. The method according to the invention can be preferably applied in further development processes of the second generation mobile communication systems, such as the GERAN (GSM Edge Radio Access Network).

It is obvious to a person skilled in the art that as the technology advances, the inventive concept can be implemented in various ways. The invention and its embodiments are thus not limited to the examples described above, but they may vary within the scope of the claims.

What is claimed is:

1. A method comprising:
   establishing a data packet connection in a telecommunications system, in which a context identifier is transmitted either as part of a compressed data packet or in a header of a data packet to be transmitted at the convergence protocol layer of the telecommunications system, the header comprising a value-limited field to which context identifiers are attached,
   selecting a transmission method of the context identifier by determining the number of available PID values in the header of the convergence protocol layer data packets,
   determining the number of context identifiers defined for a compression method,
   checking whether data transmission connection definitions of the data packet connection require the use of a header in convergence protocol layer data packets in response to the fact that the number of available PID values in the header of the convergence protocol layer data packets exceeds or equals the number of context identifiers defined for the compression method, and
   attaching the context identifiers to the headers of the convergence protocol layer data packets in response to the fact that the data transmission connection definitions of the data packet connection require the use of a header in the convergence protocol layer data packets; or
   attaching the context identifiers to a compressed data packet in response to the fact that the data transmission connection definitions of the data packet connection do not require the use of a header in the convergence protocol layer data packets.

2. The method according to claim 1, wherein said telecommunications system is a mobile communication system, whereby the method comprises:
   performing said determinations separately in a mobile station and in a radio network, and
   selecting said context identifier transmission method both in the mobile station and in the radio network.

3. A method comprising:
   establishing a data packet connection in a mobile communication system, in which a context identifier is transmitted either as part of a compressed data packet or in a header of a data packet to be transmitted at the convergence protocol layer of the mobile communication system, the header comprising a value-limited field to which context identifiers are attached,
   selecting a transmission method of the context identifier by comparing the number of available PID values in the header of the convergence protocol layer data packets with the number of context identifiers defined for a compression method only in a radio network of the mobile communication system,
   checking whether data transmission connection definitions of the data packet connection require the use of a header in convergence protocol layer data packets in response to the fact that the number of available PID values in the header of the convergence protocol layer data packets exceeds or equals the number of context identifiers defined for the compression method, and
   attaching the context identifiers to the headers of the convergence protocol layer data packets in response to the fact that the data transmission connection definitions of the data packet connection require the use of a header in the convergence protocol layer data packets; or
   attaching the context identifiers to a compressed data packet in response to the fact that the data transmission connection definitions of the data packet connection do not require the use of a header in the convergence protocol layer data packets; and
   transmitting information on the method selected for transmitting the context identifier from the radio network to a mobile station.

4. The method according to claim 3, further comprising transmitting said information to the mobile station in an RRC signalling message, which comprises a separate field for indicating the method for transmitting the context identifier.

5. The method according to claim 3, further comprising checking whether several compression algorithms are defined for the data packet connection.

6. The method according to claim 3, further comprising checking whether headers are defined for the data packet connection for transmission of sequence numbers.

7. A telecommunications system wherein a context identifier of header compression is arranged to be transmitted either as part of a compressed data packet or in a header of a data packet to be transmitted at the convergence protocol layer of the telecommunications system, the header comprising a value-limited field to which context identifiers are attached, said telecommunication system comprising:
   means for selecting a transmission method of the context identifier by determining the number of available PID values in the header of the convergence protocol layer data packets and the number of context identifiers defined for a compression method,
   means for checking whether data transmission connection definitions of the data packet connection require the use of a header in the convergence protocol layer data packets in response to the fact that the number of available PID values in the header of convergence protocol layer data packets exceeds or equals the number of context identifiers defined for the compression method, and
   means for attaching the context identifiers to the headers of the convergence protocol layer data packets in response to the fact that the data transmission connection definitions of the data packet connection require the use of a header in the convergence protocol layer data packets; or
   means for attaching the context identifiers to a compressed data packet in response to the fact that the data transmission connection definitions of the data packet connection do not require the use of a header in the convergence protocol layer data packets.

8. The telecommunications system according to claim 7, wherein said telecommunications system is a mobile communication system, and wherein said determinations are arranged to be performed separately in a mobile station and in a radio network, and said context identifier transmission method is arranged to be selected both in the mobile station and in the radio network.

9. A mobile communication system wherein a context identifier of header compression is arranged to be transmitted either as part of a compressed data packet or in a header of a data packet to be transmitted at the convergence protocol layer of the mobile communication system, the header comprising a value-limited field to which context identifiers are attached, said mobile communication system comprising:

means for selecting a transmission method of the context identifier in a radio network of the mobile communication system by comparing the number of available PID values in the header of the convergence protocol layer data packets with the number of context identifiers defined for a compression method, means for checking whether data transmission connection definitions of the data packet connection require the use of a header in the convergence protocol layer data packets in response to the fact that the number of available PID values in the header of convergence protocol layer data packets exceeds or equals the number of context identifiers defined for the compression method, and means for attaching the context identifiers to the headers of the convergence protocol layer data packets in response to the fact that the data transmission connection definitions of the data packet connection require the use of a header in the convergence protocol layer data packets; or means for attaching the context identifiers to a compressed data packet in response to the fact that the data transmission connection definitions of the data packet connection do not require the use of a header in the convergence protocol layer data packets; and wherein the mobile communications system is arranged to transmit information on the method selected for transmitting the context identifier from the radio network to a mobile station.

10. The mobile communication system according to claim 9, wherein the radio network is arranged to transmit said information to the mobile station in an RRC signalling message, which comprises a separate field for indicating the method selected for transmitting the context identifier.

11. The mobile communication system according to claim 9, wherein the telecommunications system is arranged to check whether several compression algorithms are defined for the data packet connection.

12. The mobile communication system according to claim 9, wherein the telecommunications system is arranged to check whether the headers are defined for the data packet connection for transmission of sequence numbers.

13. A network element for a mobile communication system, the network element comprising:

means for selecting a transmission method of a header compression context identifier in a radio network of the mobile communication system by comparing the number of available PID values in a value-limited field header of a convergence protocol layer data packets with the number of context identifiers defined for a compression method, means for checking whether data transmission connection definitions of the data packet connection require the use of a header in the convergence protocol layer data packets in response to the fact that the number of available PID values in the header of convergence protocol layer data packets exceeds or equals the number of context identifiers defined for the compression method, and means for attaching the context identifiers to the headers of the convergence protocol layer data packets in response to the fact that the data transmission connection definitions of the data packet connection require the use of a header in the convergence protocol layer data packets; or means for attaching the context identifiers to a compressed data packet in response to the fact that the data transmission connection definitions of the data packet connection do not require the use of a header in the convergence protocol layer data packets.

14. The network element according to claim 13, wherein the network element is arranged to transmit information on the method selected for transmitting the context identifier to a mobile station.

15. The network element according to claim 14, wherein the network element is arranged to transmit said information to the mobile station in an RRC signalling message, which comprises a separate field for indicating the method selected for transmitting the context identifier.

16. The network element according to claim 13, wherein the network element is arranged to check whether several compression algorithms are defined for the data packet connection.

17. The network element according to claim 13, wherein the network element is arranged to check whether the headers are defined for the data packet connection for transmission of sequence numbers.

18. A mobile station for a mobile communication system, said mobile station comprising:

means for selecting a transmission method of a header compression context identifier in a radio network of the mobile communication system by comparing the number of available PID values in a value-limited field header of a convergence protocol layer data packets with the number of context identifiers defined for a compression method, means for checking whether data transmission connection definitions of the data packet connection require the use of a header in the convergence protocol layer data packets in response to the fact that the number of available PID values in the header of convergence protocol layer data packets exceeds or equals the number of context identifiers defined for the compression method, and means for attaching the context identifiers to the headers of the convergence protocol layer data packets in response to the fact that the data transmission connection definitions of the data packet connection require the use of a header in the convergence protocol layer data packets; or means for attaching the context identifiers to a compressed data packet in response to the fact that the data transmission connection definitions of the data packet connection do not require the use of a header in the convergence protocol layer data packets.

19. The mobile station according to claim 18, wherein the mobile station is arranged to check whether several compression algorithms are defined for the data packet connection.

20. The mobile station according to claim 18, wherein the mobile station is arranged to check whether the headers are defined for the data packet connection for transmission of sequence numbers.

21. The method of claim 1, wherein the method is stored in a mobile station.

22. The method of claim 1, wherein the method is stored in a radio network.

* * * * *